United States Patent [19]
Becker et al.

[11] Patent Number: 5,024,498
[45] Date of Patent: Jun. 18, 1991

[54] SWITCH BOX FOR PRODUCING FREELY SELECTABLE OPTICAL PLUG CONNECTIONS

[75] Inventors: Johann A. Becker, Overath; Peter G. Deusser; Olaf W. R. Holzmann, both of Cologne, all of Fed. Rep. of Germany

[73] Assignee: U.S. Philips Corp., New York, N.Y.

[21] Appl. No.: 434,644

[22] Filed: Nov. 9, 1989

[30] Foreign Application Priority Data

Nov. 12, 1988 [DE] Fed. Rep. of Germany ....... 3838428

[51] Int. Cl.$^5$ .......................... G02B 6/00; G02B 6/26; B65D 85/38
[52] U.S. Cl. .............................. 350/96.10; 350/96.20; 350/96.21; 350/96.22; 206/316.1; 206/557
[58] Field of Search ............... 350/96.10, 96.20, 96.21, 350/96.22, 96.23; 206/316.1, 557, 565

[56] References Cited

U.S. PATENT DOCUMENTS

| | | | |
|---|---|---|---|
| 4,792,203 | 12/1988 | Nelson et al. | 350/96.20 |
| 4,805,979 | 2/1989 | Bassard et al. | 350/96.20 |
| 4,818,054 | 4/1989 | George et al. | 350/96.20 |
| 4,824,196 | 4/1989 | Bylander | 350/96.20 |
| 4,884,863 | 12/1989 | Throckmorton | 350/96.20 |
| 4,895,425 | 1/1990 | Iwano et al. | 350/96.20 |
| 4,971,421 | 11/1990 | Ori | 350/96.20 |
| 4,976,510 | 12/1990 | Davila et al. | 350/96.20 |

Primary Examiner—Brian Healy
Attorney, Agent, or Firm—Ernestine C. Bartlett

[57] ABSTRACT

The invention relates to a switch box for producing freely selectable optical connections between the LWGs of incoming optical cables and the LWGs of outgoing optical cables by means of optical shunting lines. The production of any connection is made possible in an ordered and certain way in an arrangement in which LWG groups of the incoming optical cables are connected to a first group of adjacent termination units, LWG groups of the outgoing optical cables are connected to a second group of adjacent termination units, the individual LWGs of the incoming and of the outgoing cables are connected to optical plug connector elements provided on the terminal units, the shunting lines are connected on both sides to mating connector elements, and excessive lengths of the shunting lines not required for producing a connection are stored in storage elements.

13 Claims, 2 Drawing Sheets

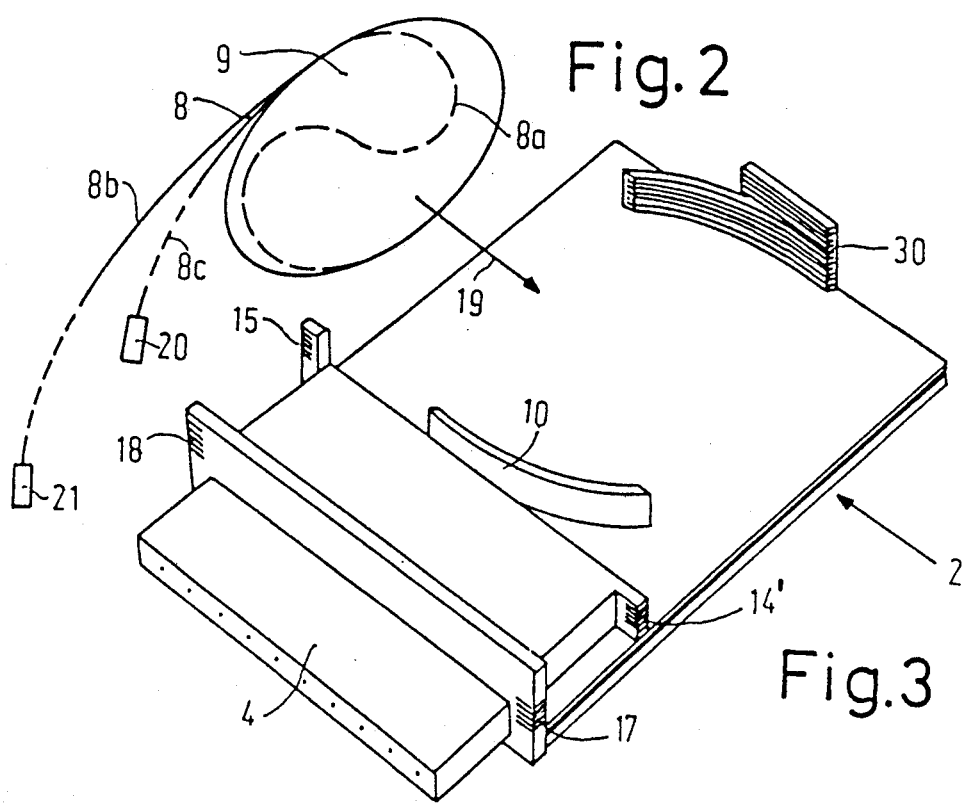
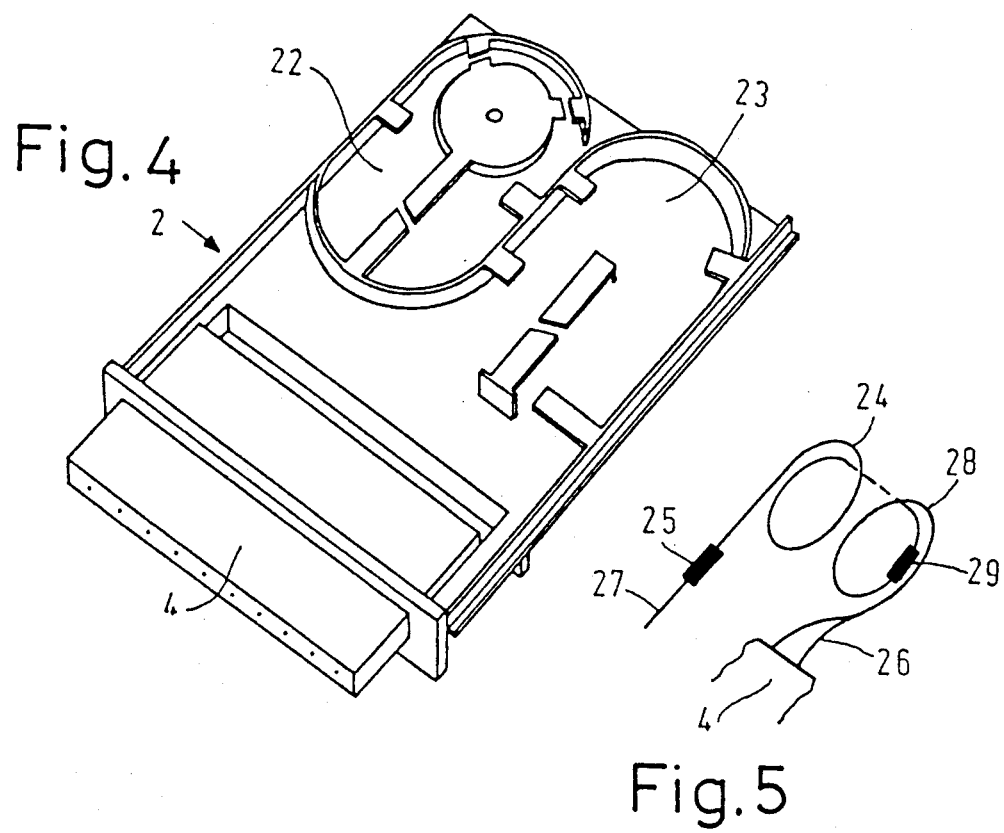

SWITCH BOX FOR PRODUCING FREELY SELECTABLE OPTICAL PLUG CONNECTIONS

FIELD OF THE INVENTION

The invention relates to a switch box for producing freely selectable optical plug connections between the light wave guides (LWGs) incoming optical cables and the LWGs of outgoing optical cables by means of optical shunting lines.

BACKGROUND OF THE INVENTION

Such an arrangement is known from No.EP-A 250 900. In this arrangement the shunting lines are inseparably spliced at one end to the individual light waveguides of the LWGs of the outgoing optical cables terminating in the termination units. The connector element of the free end of the shunting lines can be connected as desired to plug connector elements of the LWGs of the incoming optical cables which also terminate in the termination units. The shunting lines are freely suspended. They form loops corresponding to the excessive length which is not necessary for a switching path.

In particular in building up a LWG local area network switch, boxes must be available by means of which a multiplicity (for example 100) of LWGs of incoming optical cables (main cable) can be connected in a free combination possibility to a usually larger number (for example 200) of LWGs of outgoing optical cables. It must be possible to change the connections as frequently as posssible.

Such connections are customarily produced by means of the shunting lines. However, the shunting lines are subject to considerable mechanical stresses. It is particularly difficult to prevent damage in those cases when the shunting lines are provided in a disordered and freely suspended manner.

Moreover, having a number of freely suspended disordered shunting lines impedes the subsequent connection activities.

When a spliced connection of the shunting lines to the LWGs of an optical cable is made on one side, it is necessary to make a new splice place when it is required to exchange the shunting line. As a result, the length of the LWGs of the optical cables is automatically reduced. It is not possible to perform such after-splice-processes unrestrictedly and, moreover such after-splice-processes adversely affect the substance of the optical cables which are very expensive.

SUMMARY OF THE INVENTION

An object of the invention is to produce a switch box of the type mentioned in the opening paragraph in such a manner that any connection can be simply produced and damage to the shunting lines is eliminated as much as possible. In particular any damage that is not eliminated should not have any detrimental effect on the optical cables guided in the switch box.

This object is achieved in an arrangement wherein (a) the LWG groups of the incoming optical cables are connected to a first group of adjacent terminating units; (b) the LWG groups of the outgoing optical cables are connected to a second group of adjacent termination units; (c) the individual LWGs of the incoming and the outgoing cables are connected to optical plug connector elements provided on the termination units; (d) that shunting lines are connected at both ends to mating connector elements and (e) the excessive lengths of the shunting lines that are not required in the production of connections can be stored in storage elements.

The optical cables guided in the switch box are rigidly connected to the connector elements of the termination units. Subsequent activities in the optical route to the plug connector elements are not required since switching connections with the shunting lines are produced only via connectors.

The excess lengths of the shunting lines are not freely suspended. They do not disturb and consequently can neither impede subsequent switching works, nor constitute a source of danger for accidental damage.

In a preferred embodiment, the termination units are formed as slide-in units which can be slid into the switch box and to which a group of LWGs either of an incoming or an outgoing cable is held with pull-relief (i.e. strain-relief) and which comprise storage spaces for storing available lengths of the LWGs required for the production of spliced connections.

For the connection activities and in particular for the splicing of the LWGs of the optical cables with the LWG ends (pigtails) of the connector elements, the termination unit in question is guided on drawer guides and is pulled out so that the required operations at the freely accessible termination units can be performed without hindrance.

In an especially preferred embodiment it is ensured that storage holders for a number of storage elements corresponding to the number of plug connector elements of the termination unit are spatially associated at least with a part of the termination units.

The immediate proximity of the stores of the storage elements to an associated plug connector element of a termination unit means that the free route of the shunting lines is very short and a systematic guiding is possible.

In a preferred embodiment the storage holders are parts of the termination units. In that case the route of a shunting line to its associated plug connector element is particularly short and conveniently arranged.

In general, only connections from one LWG of an incoming cable to an LWG of an outgoing cable have to be produced. In that case at most as many storage elements for shunting lines are required as there are LWGs of incoming cables available. The overall number of the LWGs of the outgoing cables, however, may be very much larger. In this case preferably the storage holders are associated with the termination units for the incoming cables.

Additionally, in this case a given storage space for a shunting line may be associated with each plug connector element of an LWG of an incoming cable. A mechanic then knows without searching which shunting line he has to choose for a given switch path. A desirable guiding possibility of the shunting line is then automatically obtained.

A space-saving and easily used embodiment is provided wherein the storage spaces and the storage holders are provided on oppositely located sides of the termination units.

A preferred storage possibility for the storage elements is obtained wherein the storage elements for the shunting lines can be stored in the store holders for the termination units in a direction substantially perpendiuclar to the slide-in direction. The storage holders may be constructed so that storage elements can be inserted from both sides of the pulled-out termination units.

An ordered guiding of the shunting lines without crossings in the area of the termination units is made possible in that guides for the ends of the shunting lines terminating from each storage element are associated with the storage holders.

Intolerable stresses and curvatures of the ends of the shunting lines emanating from the storage elements that are too short are avoided in pulling out a termination unit when the guides are provided on the termination units in such a manner that the ends of the shunting lines to be guided to other termination units extend freely and unconnectedly in the front area of a termination unit.

To ensure that switching lengths of the shunting line guided between two connector elements are held securely on their way, guides are provided outside the pull-out area of the termination units for laying the switching lengths of the shunting lines. Since the shunting lines do not extend in front of the area of the termination units they can impede neither the subsequent laying activities nor the pulling-out of the termination units.

In another embodiment the groups of the termination units of the incoming and the outgoing cables are arranged in a common row and the guides for the switching lengths of the shunting lines are provided, preferably on both sides, beside the row of termination units.

Storage elements of the type described in No. DE-OS 37.06.518 are preferably suitable for the storage of the non-required excessive lengths of the shunting line. Shunting lines are guided loosely by an S-shaped cannel of their storage elements and excessive lengths of the shunting lines can be wound parallel and in common around a coil former of the storage elements.

It has further proved advantageous that the termination units comprise two storage spaces of which the first serves to provide a length of store of the total length of the LWGs guided in the termination unit, while in the second storage space available lengths of the LWGs and of the pigtail-LWGs necessary for the production of the spliced connections can be provided between the individual LWGs and the pigtail-LWGs of the plug connector elements.

Available lengths of the LWGs supplied by an optical cable are first provided in the first storage space. Available lengths required for the production of the spliced connections with the pigtail-LWGs of the plug connector elements may then be drawn from the first storage space and stored in common with the pigtail-LWGs in the second storage element after producing the spliced connections.

BRIEF DESCRIPTION OF THE DRAWINGS

The invention and its advantages will now be described in greater detail with reference to this preferred embodiments shown in the drawing.

FIG. 2 shows the principle of a storage element for a shunting line, FIG. 3 is a perspective view of the top side of a termination unit, FIG. 4 is a perspective view of the lower side of a termination unit, and FIG. 5 shows diagrammatically the storage of a group of LWGs connected to plug connector elements in storage spaces shown in FIG. 4

DETAILED DESCRIPTION OF PREFERRED EMBODIMENTS

Figure 1:
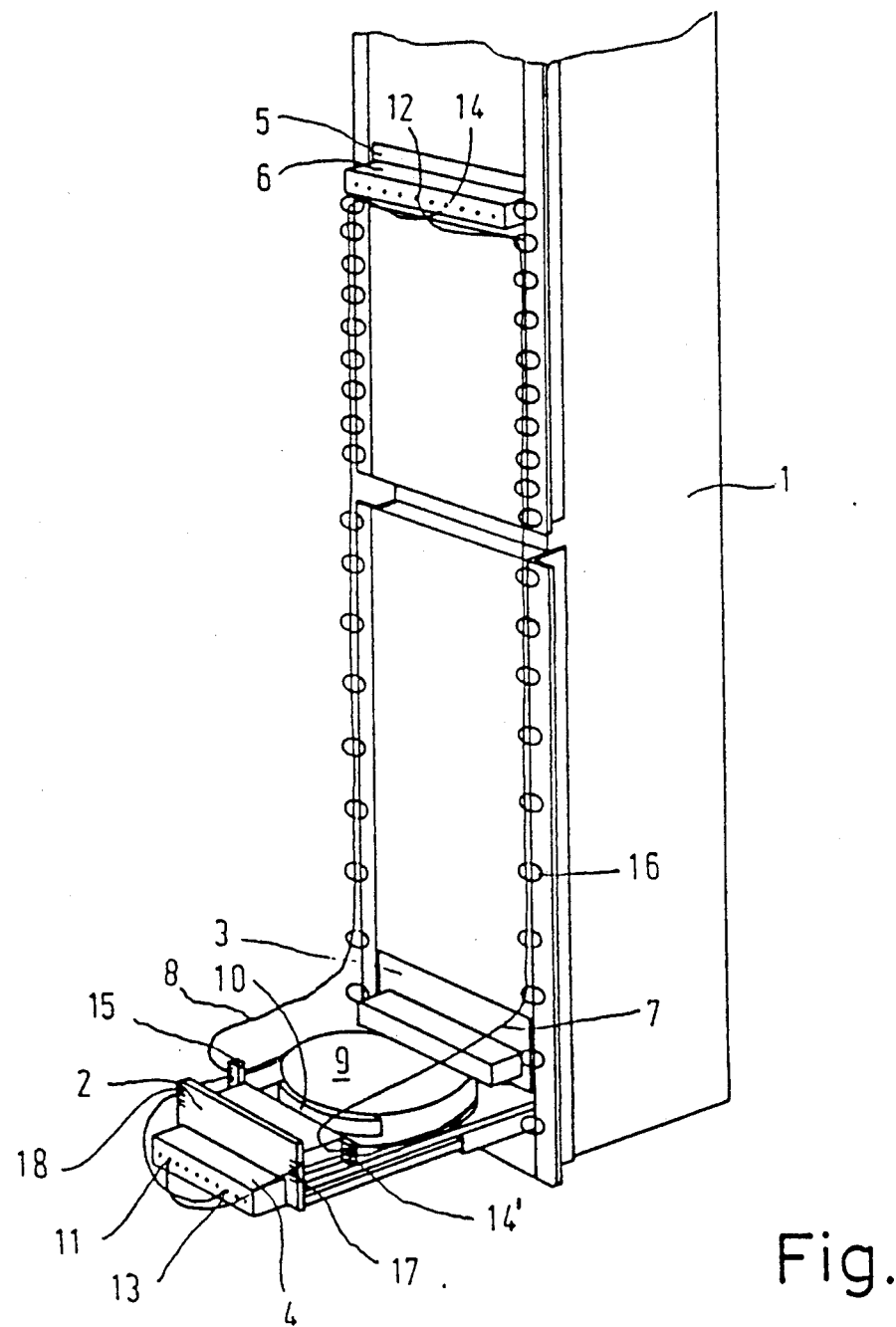
FIG. 1 is a simplified perspective view of a switch box constructed according to the invention.

In the housing 1 of the switch box shown in FIG. 1, termination units 2 and 3 and further units not shown are provided one above the other in the manner of a drawer guide. The termination unit 2 is shown in the pulled-out position. These lower termination units are each connected to a group of ten LWGs of an incoming optical cable combined to form a flat tape. Each of these ten LWGs is optically connected to a plug connector element of the plug board 4.

Termination units 5 are provided one on top of the other so that they can be pulled out in the upper area of the housing 1 for connection of a group of ten LWGs to the plug connector elements of the plug board, 6 each time 10 LWGs of an outgoing optical cable terminate. These LWGs may also be combined again to a flat tape or they may be individual LWGs of a cable unit.

In general the number of termination units 5 for outgoing cables is larger than the corresponding number for incoming cables since many more outgoing optical lines are available than incoming optical lines. It must be possible to switch an optical connection from each plug connector element of each lower termination unit to any one plug connector element of each of the upper termination units. For this purpose single core shunting lines 7 and 8, respectively, may be used, each comprising at each end a counter plug connector element fitting on the plug connector elements of the latches (i.e. plug boards) 4 and 6, respectively. The length of the shunting lines 7 and 8 corresponds to the longest possible route. Lengths of line not needed for shorter routes are reeled in flat storage elements 9 of which a number corresponding to the number of plug connector elements of a termination unit 2 can be inserted laterally in storage holders 10 of a termination unit 2. No storage elements need be associated with the upper termination units 5 since maximally only each of the LWGs of the incoming cables is to be connected to one LWG of the outgoing cable.

The shunting line 7 produces an optical connection between the plug connector elements 11 and 12. The shunting line 8 connects the plug connector elements 13 and 14. In the same manner a plurality of further switching connections can be produced in any manner. On their route the ends of the shunting lines 7 and 8 leading to the upper termination units 5 and which are fixed between their storage elements 9 and guides 14' and 15, respectively, are provided in guides 16 which are formed as eyelets opened by insertion slots outside the pull-out range of the termination units 2, 3 and 5 at the edge of the housing 1.

In the area between the guides 14' and 15, respectively on the one hand and the lower guide 16 holding the shunting lines 7 and 8, respectively, a small free length is provided which permits a pulling-out of the termination units 2 and 3, respectively, without detrimental curvature of the shunting lines. This free length may be short in that the guides 14' and 15, respectively, are set back from the side of the plug board 4 to the storage elements 9.

The other ends of the shunting lines 7 and 8 are guided on a very short path to the plug connector elements 11 and 13, respectively, and, besides in the set-back guides 14' and 15, respectively, they are guided in further holding slots 17 and 18, respectively. On this short path only slight curvatures of the shunting lines are formed when in particular shunting lines coming from the left are guided to a plug connector element on the right-hand of the plug board 4, and vice versa. In the arrangement shown in FIG. 1 the shunting lines are guided on ordered paths so that the possibility of damage is small. Additionally, the area in front of the termination units and their plug connector elements is always freely accessible. A plurality of switching connections also remains always conveniently arranged.

The construction and function of the termination units 2 and of the associated storage elements 9 will be described in greater detail with reference to FIGS. 2 to 5.

FIG. 3 shows a termination unit 2 in the same position as shown in FIG. 1 on an enlarged scale. For better explanation of the principle according to the invention constructive details are not shown.

In FIG. 4 the termination unit 2 is shown switched over 180° so that its rear side not shown in FIG. 1 becomes visible.

With particular reference to FIG. 2, there is shown the storage holders 10 and 30 for a plurality of storage elements 9 to be inserted each holder consisting of two parts, a flat part and a curved part adapted to the circular outer contour of the storage elements 9 which in the storage holders 10 and 30 are arranged one above the other in converted spatial sequence. In the guides of the lower sections five storage elements 9 can be inserted from the right one on top of the other and in the guides of the upper sections also five further storage elements 9 can be inserted from the left in the direction of the arrow 19.

In the storage element 9, the shunting line 8 is guided with a central area 8a through an S-shaped channel of the storage element 9. For convenience of insertion the storage elements are preferably formed in two parts. By combining the two parts the insertion channel which at first was freely accessible is covered. In a circular groove of the storage element 9, which radially is open outwards, both ends 8b and 8c may then be wound parallel simultaneously. The shorter end 8c comprising the plug connector element 20 serves for the connection to the plug board 4, while the longer end 8b comprising the connector element 21 serves for the connection with a plug board 6 of an upper termination unit 5 shown in FIG. 1.

Since the shunting line 8 in the S-shaped channel of the storage element 9 is guided loosely, the storage element, after producing the connections and laying the ends 8b in the guide 15 and the ends 8c in the guides 15 and 18, can be moved in such a central longitudinal position of the shunting line that lengths of the ends 8b and 8c not needed disappear in the storage element in the subsequent winding process.

In FIG. 4 storage spaces 22 and 23 can be seen on the rear side of the termination unit 2. In the storage space 22 turns 24 (FIG. 5) of an incoming LWG flat tape 27 comprising, ten individual LWGs, which tape, in addition to connection to the housing 1, is also connected with pull-relief to the termination unit 2 at a position 25, are spirally laid end up. The end of the LWG flat tape 27 is guided in the storage space 23 through a channel which is not shown in the drawing in a flat position rotated through 90° (broken line area in FIG. 5). When spliced connections 29 to the pigtail 26 of the plug connector elements of the plug board 4 are to be produced, a required available length of the turn 24 is pulled out of the storage space 23. The excessive lengths of the pigtails 26 and of the part of the LWG flat tape 27 that are no longer needed after the splicing are stored in the storage space 23 (see turn 28 in FIG. 5).

We claim:

1. A switch box for producing freely selectable optical plug connections between LWG groups (27) of incoming optical cables and LWG groups of outgoing optical cables by means of optical shunting lines (7, 8), wherein LWG groups (27) of the incoming optical cables are connected to a first group of adjacent termination units (2) and LWG groups of the outgoing optical cables are connected to a second group of adjacent terminating units (5), the individual LWGs of the incoming and the outgoing cables being connected to optical plug connector elements (11, 12, 13, 14) provided on the termination units (2 and 5, respectively), the shunting lines (7, 8) being connected at both ends to mating connectors (20, 21), and wherein storage elements (9) are provided for storage of excessive lengths of the shunting lines (7, 8) not required for the production of a connection.

2. A switch box as claimed in claim 1, wherein the termination units (2, 5) are constructed as slide-in units which can be slid into the switch box and to which a LWG group (27) either of an incoming or of an outgoing cable is held, the units (2, 5) also comprising storage spaces (22, 23) for storing available lengths of the LWGs required for producing spliced connections (29).

3. A switch box as claimed in claim 1 or 2, wherein storage holders (10, 30) for a number of storage elements (9) corresponding to the number of plug connector elements (11, 13) of the termination unit (2) are spatially associated at least with a part of the termination units.

4. A switch box as claimed in claim 3, wherein the storage holders (10, 30) are parts of the termination units (2).

5. A switch box as claimed in claim 4, wherein the storage holders (10, 30) are associated with the termination units (2) for the incoming cables.

6. A switch box as claimed in claim 3, wherein the storage spaces (22, 23) and the storage holders (10, 30) are provided on oppositely located sides of the termination units (2).

7. A switch box as claimed in claim 3, wherein the storage elements (9) for the shunting lines (7, 8) can be stored in the storage holders (10, 30) for the termination units (2) in a direction substantially perpendicular to the direction of insertion.

8. A switch box as claimed in claim 3, wherein guides (14', 15, 17, 18) for the ends (8b, 8c) of the shunting line (8) terminating from each storage element (9) are associated with the storage holders (10, 30).

9. A switch box as claimed in claim 8, wherein the guides (14', 15) are provided on the termination units (2) in such a manner that the ends (8b) of the shunting lines (8) to be guided to other terminal units (5) extend freely and unconnectedly in the front area of a termination unit (2).

10. A switch box as claimed in claim 1, wherein guides (16) for inserting the switching lengths of the shunt lines (7, 8) are provided outside the pull-out area of the termination units (2, 5).

11. A switch box as claimed in claim 10, wherein the groups of termination units (2 and 5, respectively) of the incoming and outgoing cables are arranged in a common row and the guides (16) for the switching lengths of the shunting lines (7, 8) are provided, preferably on both sides, beside the row of termination units (2, 5).

12. A switch box as claimed in claim 1, wherein the shunting lines (7, 8) are guided loosely by an S-shaped channel of their storage elements (9) and excessive lengths of the shunting lines (7, 8) can be wound parallel and in common around a coil former of the storage elements (9).

13. A switch box as claimed in claim 1, wherein the termination units (2) comprise two storage spaces (22, 23) of which the former (22) serves to provide a length of store of the overall length of the LWG (27) guided in the termination unit (2), while in the second storage space (23) available lengths of the LWGs and of pigtail-LWGs (26) required for the production of the spliced connections (29) can be provided between the individual LWG and the pigtail-LWGs (26) of the plug connector elements.

* * * * *